United States Patent
Hozumi

(10) Patent No.: US 8,846,219 B2
(45) Date of Patent: Sep. 30, 2014

(54) PERPENDICULAR MAGNETIC RECORDING MEDIUM

(75) Inventor: Yasuaki Hozumi, Minami-Alps (JP)

(73) Assignee: Fuji Electric Co., Ltd., Kawasaki-Shi (JP)

( * ) Notice: Subject to any disclaimer, the term of this patent is extended or adjusted under 35 U.S.C. 154(b) by 0 days.

(21) Appl. No.: 13/417,198

(22) Filed: Mar. 9, 2012

(65) Prior Publication Data

US 2012/0288735 A1 Nov. 15, 2012

(30) Foreign Application Priority Data

May 12, 2011 (JP) .................................. 2011-107163

(51) Int. Cl.
G11B 5/66 (2006.01)

(52) U.S. Cl.
USPC ........................................................ 428/831

(58) Field of Classification Search
None
See application file for complete search history.

(56) References Cited

U.S. PATENT DOCUMENTS

| 6,777,066 B1 | 8/2004 | Chang et al. |
| 2002/0127435 A1 | 9/2002 | Uwazumi et al. |
| 2004/0028950 A1* | 2/2004 | Kanbe et al. ............ 428/694 TS |
| 2010/0014191 A1 | 1/2010 | Kanazawa |

FOREIGN PATENT DOCUMENTS

| EP | 1801790 A1 | 6/2007 |
| JP | 2002-200126 A | 7/2002 |
| JP | 2010-027110 A | 2/2010 |

* cited by examiner

*Primary Examiner* — Holly Rickman
(74) *Attorney, Agent, or Firm* — Rabin & Berdo, P.C.

(57) ABSTRACT

This document discloses a perpendicular magnetic recording medium in which the magnetic anisotropy of a magnetic recording layer is raised and the thermal stability of recorded signals is improved without changing the conventional stacked configuration. A perpendicular magnetic recording medium is formed by stacking at least an intermediate layer, a second underlayer, and a magnetic recording layer in this order on a nonmagnetic base. The intermediate layer is either a single layer of Ru or a Ru-based alloy, or a stacked structure of a nonmagnetic alloy film including Co and Cr and a film of Ru or a Ru-based alloy. The second underlayer includes Co in the range from 30 at % to 75 at %, Cr in the range from 20 at % to 60 at %, and W in the range from 0.1 at % to 10 at %, and has a thickness in the range from 0.1 nm to 1.0 nm.

4 Claims, 3 Drawing Sheets

PERPENDICULAR MAGNETIC RECORDING MEDIUM

CROSS-REFERENCE TO RELATED APPLICATION

This application claims the benefit of priority of Japanese patent application number 2011-107163, filed on May 12, 2011, the disclosure of which is incorporated herein by reference.

BACKGROUND OF THE INVENTION

1. Field of the Invention

This invention relates to a perpendicular magnetic recording medium mounted in various magnetic recording devices. More specifically, this invention relates to a perpendicular magnetic recording medium for hard disk drives (HDDs) used as external storage devices in computers, audio and video equipment and the like.

2. Description of the Related Art

Since 1997, the recording density of HDDs has risen rapidly at an annual rate of from 60 to 100%. As a result of this remarkable growth, the in-plane magnetic recording methods which have heretofore been used are approaching the limits of density increases. In light of this state of affairs, in recent years perpendicular magnetic recording methods enabling higher densities have attracted much attention, and have been the object of vigorous research and development. And since 2005, there has been the beginning of commercialization of HDDs adopting perpendicular recording methods among a portion of device models.

Perpendicular magnetic recording media include, at least, a magnetic recording layer of a hard magnetic material, and optionally a under layer to orient the magnetic recording layer in the target direction; a protective film to protect the surface of the magnetic recording layer; and a under layer of soft magnetic material, serving to concentrate in the magnetic recording layer the magnetic flux generated by the magnetic head used in recording in the magnetic recording layer. In order to improve the signal output-noise ratio (S/N) of the magnetic recording medium, the basic characteristics of the magnetic recording medium must be improved. To further raise recording densities, improved thermal stability of signals recorded in perpendicular magnetic recording media is sought. And in order to raise thermal stability, increases in the magnetic anisotropy Ku of the magnetic recording layer are sought. In order to increase the magnetic anisotropy, studies are being conducted using crystal magnetic anisotropy as represented by $L1_0$ and other structures, or using interface magnetic anisotropy employing multilayer films.

A technique has been proposed in which, by inserting a second intermediate layer to relax the misfit in lattice constants of a first intermediate layer formed of Ru or another nonmagnetic metal and the magnetic recording layer having a granular structure, the easy axis of magnetization of magnetic crystal grains in the granular structure are aligned (see for example Japanese Patent Application Laid-open No. 2002-208126). In this proposal, it is held to be desirable that the misfit between the lattice constants (a axis and c axis) of the second intermediate layer and the magnetic crystal grains of the magnetic recording layer, and the misfit between the lattice constants (a axis and c axis) of the first intermediate layer and second intermediate layer, be held to 3% or less. As material for the second intermediate layer, it is stated that alloys obtained by adding Nb, Ru, W, Pt, or similar to CoCr are used. However, in order to improve the performance of the magnetic recording medium, further improvements have been necessary when reducing the film thickness of an intermediate layer.

Further, a technique has been proposed in a perpendicular magnetic recording medium using a magnetic recording layer having an antiferromagnetic exchange coupled structure in which a nonmagnetic second intermediate layer having a granular structure is provided below a first magnetic recording layer including Ru, and by forming nonmagnetic grains from CoCr alloy not including Ru, and forming grain boundaries from an oxide of a metal (Si, Cr, Ti, W, or similar), Ru included in the second intermediate layer and lower constituent layers is prevented from diffusing into the magnetic recording layer and disturbing the antiferromagnetic exchange coupled structure of the magnetic recording layer (see for example Japanese Patent Application Laid-open No. 2010-27110).

SUMMARY OF THE INVENTION

An object of this invention is to raise the magnetic anisotropy of the magnetic recording layer and improve the thermal stability of recorded signals, without changing the conventional stacked configuration.

As a result of diligent studies of the above problem, it was found that by introducing a thin layer comprising CoCrW between a layer of Ru or a Ru-based alloy belonging to an intermediate layer stack and the magnetic recording layer, the magnetic coercivity, which is an index of magnetic anisotropy, can be increased, leading to the attainment of this invention. A perpendicular magnetic recording medium of this invention has a structure in which at least an intermediate layer, a second underlayer and a magnetic recording layer are stacked in this order on a nonmagnetic base, and the intermediate layer is either a single layer of Ru or a Ru-based alloy, or a stacked structure of a nonmagnetic alloy layer including Co and Cr and a layer of Ru or a Ru-based alloy, and the second underlayer includes 30 at % or more and 75 at % or less Co, 20 at % or more and 60 at % or less Cr, and 0.1 at % or more and 10 at % or less W, and has a film thickness of 0.1 nm or greater and 1.0 nm or less. Here, it is desirable that the intermediate layer have a film thickness of 0.1 nm or greater and 30 nm or less. Further, it is desirable that the magnetic recording layer be formed using material having a granular structure in which magnetic crystal particles are dispersed in a matrix of a nonmagnetic oxide or a nonmagnetic nitride.

In a perpendicular magnetic recording medium of this invention, by forming the magnetic recording layer on a stacked structure of an intermediate layer including a layer of Ru or a Ru-based alloy and a second intermediate layer including CoCrW with a particular composition and having a particular film thickness, it was possible to realize improved magnetic anisotropy of the magnetic recording layer and improved thermal stability of signals recorded in the perpendicular magnetic recording medium. By this means, a perpendicular magnetic recording medium of this invention can accommodate magnetic recording at high densities.

DESCRIPTION OF THE PREFERRED EMBODIMENTS

Figure 1:
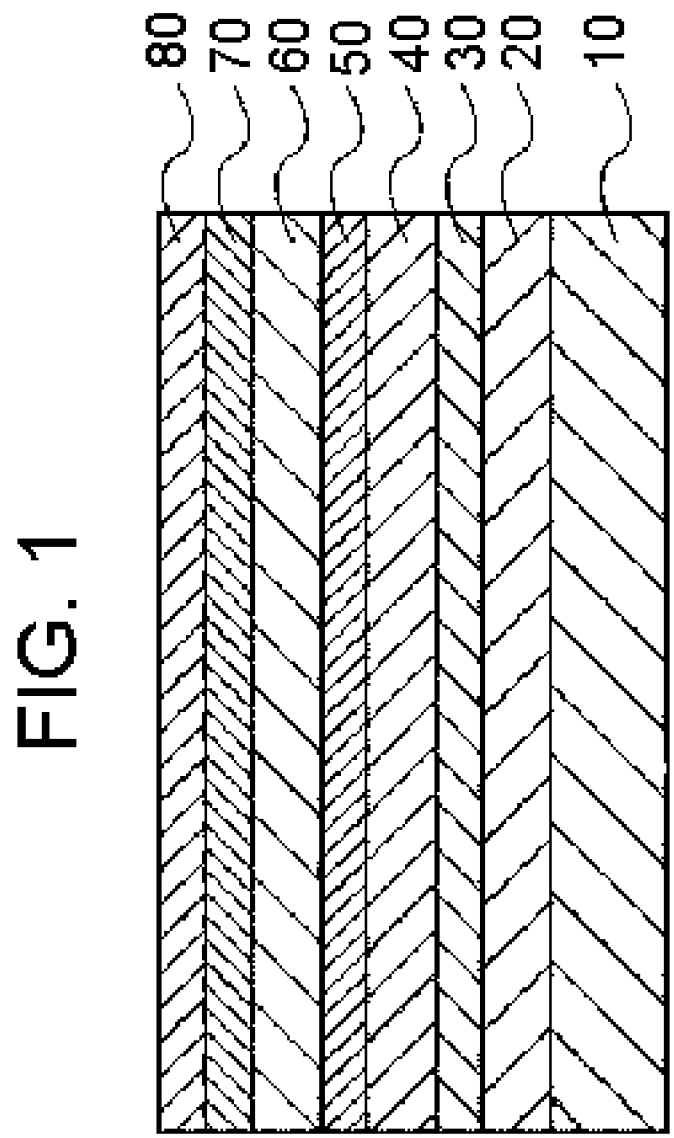
FIG. 1 is a cross-sectional schematic view used to explain an example of the configuration of a perpendicular magnetic recording medium of the invention.

A perpendicular magnetic recording medium of this invention has a structure in which at least an intermediate layer, a second underlayer, and a magnetic recording layer are stacked in this order on a nonmagnetic base. Here, the intermediate layer is either a single layer of Ru or a Ru-based alloy, or a stacked structure of a nonmagnetic alloy film including Co and Cr and a film of Ru or a Ru-based alloy. The second underlayer has a film thickness of 0.1 nm or greater and 1 nm or less, and includes 30 at % or more and 75 at % or less Co, 20 at % or more and 60 at % or less Cr, and 0.1 at % or more and 10 at % or less W. A perpendicular magnetic recording medium of this invention may optionally include, between the nonmagnetic base and the intermediate layer, a soft magnetic under layer, a first underlayer, and other layers, and may include, on the magnetic recording layer, a protective layer, a liquid lubricant layer, and other layers. FIG. 1 shows an example of a perpendicular magnetic recording medium of this invention. The perpendicular magnetic recording medium shown in FIG. 1 includes a nonmagnetic base 10, soft magnetic under layer 20, first underlayer 30, intermediate layer 40, second underlayer 50, magnetic recording layer 60, protective layer 70, and liquid lubricant layer 80.

As the nonmagnetic base 10, various bases, well known in this technical field, with smooth surfaces can be used. For example, Al alloy with NiP plating, reinforced glass, crystallized glass, and similar materials can be used as the nonmagnetic base 10.

The soft magnetic under layer 20 is a layer having the function of concentrating magnetic flux generated by the magnetic head in the magnetic recording layer during recording to the magnetic recording layer. The soft magnetic under layer 20 can be formed using FeTaC, Sendust (FeSiAl) alloy, or another crystalline material, or using CoZrNb, CoTaZr, or another amorphous material including a Co alloy. The optimum value of the film thickness of the soft magnetic under layer 20 varies depending on the structure and characteristics of the magnetic head used in recording, but in consideration of production efficiency, a thickness of approximately 10 nm or greater and 500 nm or less is desirable.

The first underlayer 30 has the function of controlling the crystal orientation, crystal grain diameters and similar features of the intermediate layer 40, second underlayer 50 and/or magnetic recording layer 60 formed thereupon. The first underlayer 30 can be formed using material including at least Ni and Fe and having the face-centered cubic (fcc) structure. Considering that the crystal grain diameter increases with increasing film thickness, and that there is an effect on transition noise and other performance of the magnetic recording medium, it is desirable that the first underlayer 30 have a film thickness of 1 nm or greater and 20 nm or less, and preferably 3 nm or greater and 10 nm or less.

The intermediate layer 40 has the function of controlling the crystal orientation, crystal grain diameters, grain boundary segregation and similar of the second underlayer 50 as well as the magnetic recording layer 60 formed thereupon. The intermediate layer 40 may be a single layer, or may have a stacked configuration of two films. An intermediate layer 40 comprising a single layer can be formed from Ru, or from a Ru-based alloy comprising Ru and one or a plurality of metals selected from among a group comprising C, Cu, W, Mo, Cr, Ir, Pt, Re, Rh, Ta, and V. An intermediate layer with a two-film stacked configuration comprises an upper film formed from Ru or the above-described Ru-based alloy, and a lower film formed from a nonmagnetic alloy including Co and Cr. It is desirable that the intermediate layer 40 have a film thickness (in the case of a stacked configuration, a total film thickness) of 0.1 nm or greater and 30 nm or less, and preferably 1 nm or greater and 20 nm or less.

The second underlayer 50 has the function of controlling the crystal orientation, crystal grain diameters, grain boundary segregation, and similar of the magnetic recording layer 60 formed thereupon. The second underlayer 50 is formed using a material including Co, Cr and W. This material includes, on the basis of the total number of atoms in the material, 30 at % or greater and 75 at % or less Co, 20 at % or greater and 60 at % or less Cr, and 0.1 at % or greater and 10 at % or less W. The second underlayer 50 has a film thickness of 0.1 nm or greater and 1.0 nm or less.

The magnetic recording layer 60 can be formed using a granular structure magnetic material, in which magnetic crystal particles are dispersed in a matrix of a nonmagnetic oxide or a nonmagnetic nitride. Magnetic crystal particles include at least one type of metal selected from among a group comprising Co, Ni and Fe, and may further include at least one metal selected from a group comprising Cr, Pt, Ta, B, Nb, N and Cu. Magnetic crystal particles can be formed using, for example, CoPt, CoCrPt, CoCrPtB, and CoCrPtTa. On the other hand, the nonmagnetic oxide or nonmagnetic nitride which becomes the matrix of the granular structure includes $SiO_2$, $TiO_2$, $Al_2O_3$, AlN, $Si_3N_4$, or similar. Granular structure magnetic materials which can be used include CoPt—$SiO_2$, CoCrPtO, CoCrPt—$SiO_2$, CoCrPt—$TiO_2$, CoCrPt—$Al_2O_3$, CoPt—AlN, CoCrPt—$Si_3N_4$, and similar, but are not limited to these. By using a granular structure magnetic material, magnetic separation between magnetic crystal grains in proximity within the magnetic recording layer 60 is promoted, and medium characteristics can be improved (noise reduced, SNR improved, recording resolution improved, and similar). No limits in particular are placed on the film thickness of the magnetic recording layer 60. However, from the standpoint of achieving both high productivity and high recording densities, it is desirable that the magnetic recording layer 60 have a film thickness of 30 nm or less, and preferably 15 nm or less.

The protective layer 70 is a layer used to protect the underlying magnetic recording layer 60 and lower constituent layers. As the protective layer 70, for example a thin film the principal component of which is carbon can be used. Otherwise, various thin film materials known in this technical field as materials for protection of magnetic recording media may be used to form the protective layer 70.

The liquid lubricant layer 80 is a layer used to provide lubrication when a read-write head flies over or is in contact with the magnetic recording medium. The liquid lubricant layer 80 can be formed using for example a perfluoro polyether based liquid lubricant, or various liquid lubricant materials known in this technical field.

Each of the layers stacked on the nonmagnetic base 10 can be formed using various film deposition techniques normally used in the field of magnetic recording media. Formation of each layer from the soft magnetic under layer 20 to the protective layer 70 can for example employ a sputtering method (including a DC magnetron sputtering method, RF magnetron sputtering method, and similar), vacuum evaporation deposition method, and similar. When forming a protective layer 70 the principal component of which is carbon, in addition to the above methods, a plasma CVD method can also be used. On the other hand, to form a liquid lubricant layer 80, for example a dipping method, spin coating method, or other application technique can be used.

Example 1

As the nonmagnetic base 10, an Al substrate the surface of which was plated with a smooth NiP film (S13 aluminum substrate manufactured by Fuji Electric Device Technology Co., Ltd.) was prepared, and was cleaned. The cleaned nonmagnetic base 10 was introduced into a DC magnetron sputtering apparatus. Then, in Ar gas at 0.67 Pa, a Co54Fe9Ta6Zr target (on the basis of the total number of atoms, 54 at % Fe, 9 at % Ta, 6 at % Zr, balance Co; similarly below) was used to form a Co54Fe9Ta6Zr amorphous soft magnetic under layer 20 of film thickness 30 nm. Next, a Ni20Cr2Si target was used to form a Ni20Cr2Si first underlayer 30 of film thickness 6 nm in Ar gas at pressure 0.67 Pa. The Ni20Cr2Si film obtained had the fcc structure. Next, a Ru target was used to form a Ru intermediate layer 40 of film thickness 8 nm in Ar gas at pressure 4.0 Pa. Then, a Co26Cr2W target was used to form a Co26Cr2W second underlayer 50 in Ar gas at pressure 0.67 Pa. Here the film thickness of the second underlayer 50 was varied in the range 0.3 nm to 1.5 nm. Next, a 90(Co12Cr16Pt)-10SiO$_2$ target was used to form a CoCrPt—SiO$_2$ magnetic recording layer 60 of film thickness 5 nm at pressure 5.3 Pa. Finally, a carbon target was used to form a carbon protective layer 70 of film thickness 2.5 nm, to obtain a perpendicular magnetic recording medium.

Example 2

Except for the fact that the target composition was changed to Co38Cr2W when forming the second underlayer 50, the same procedure as in Example 1 was used to fabricate the perpendicular magnetic recording medium.

Example 3

Except for the fact that the target composition was changed to Co42Cr2W when forming the second underlayer 50, the same procedure as in Example 1 was used to fabricate the perpendicular magnetic recording medium.

Comparative Example 1

Except for the fact that a second underlayer 4 was not formed, the same procedure as in Example 1 was used to fabricate the perpendicular magnetic recording medium.
(Evaluations)

Figure 2:
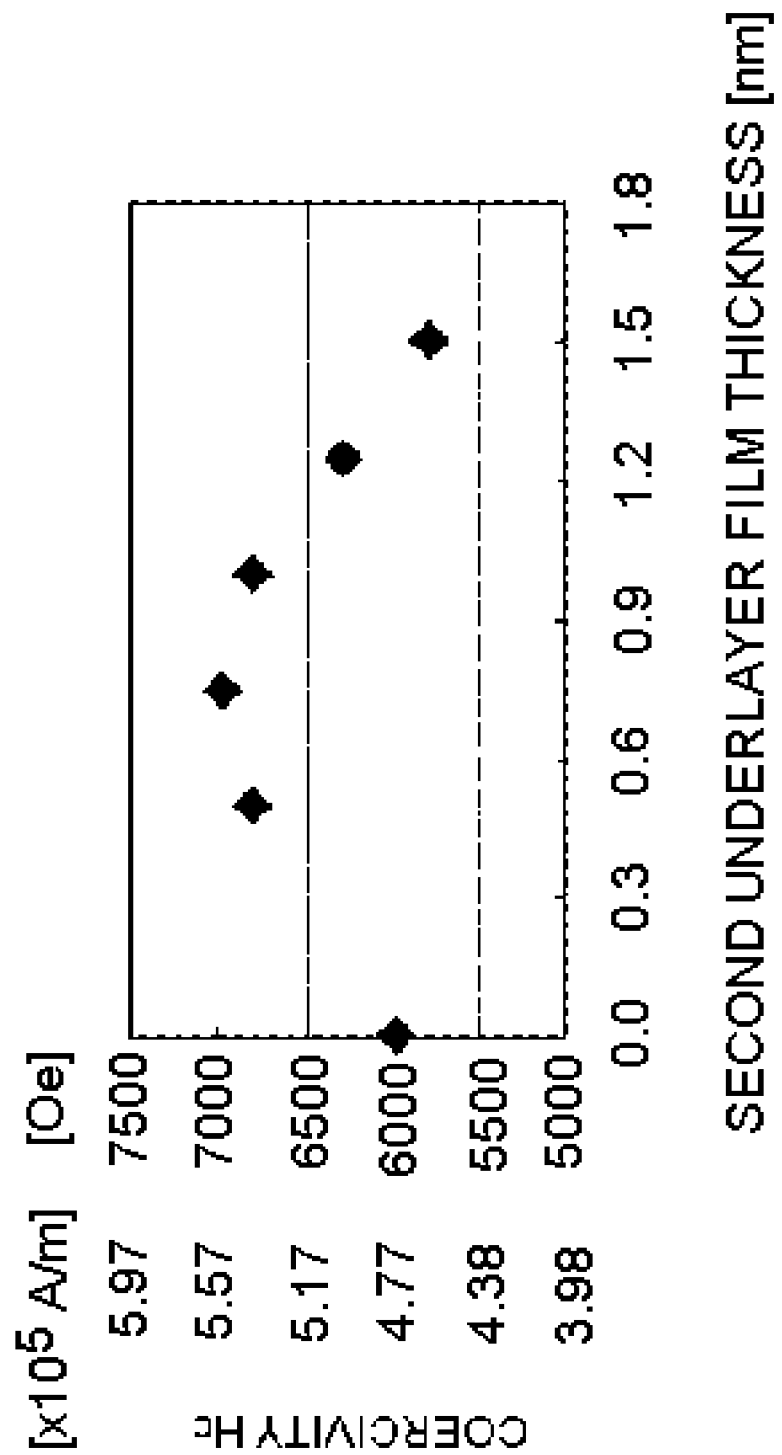
FIG. 2 is a graph showing the relation between film thickness of the second underlayer and coercivity in Example 1.

A Kerr effect measurement apparatus was used to measure the coercivity Hc of perpendicular magnetic recording media obtained in Example 1 and Comparative Example 1. FIG. 2 shows the relation between the film thickness of the second underlayer 50 in Example 1 and the coercivity Hc of the perpendicular magnetic recording medium obtained. As is seen from FIG. 2, compared with Comparative Example 1 (the case of a film thickness of 0 nm), the coercivity Hc was increased by 17 to 20% (that is, the magnetic anisotropy of the magnetic recording layer was increased) for the perpendicular magnetic recording media of Example 1, in which CoCrW second underlayers 50 of thickness 0.5 to 1.0 nm were formed. Further, the coercivity Hc does not increase monotonically with increasing film thickness of the second underlayer 50, but takes a maximum value at a film thickness of 0.7 nm. That is, it is seen that there exists an optimum value for the film thickness of the second underlayer 50 to realize the maximum coercivity Hc.

Upon performing similar studies for Examples 2 and 3, similarly to Example 1, it was found that an optimum value exists for the film thickness of the second underlayer 50 to realize the maximum coercivity Hc. The optimum values of the film thickness of the second underlayer 50, and the coercivity Hc at the optimum film thicknesses, appear in Table 1.

TABLE 1

| | Second underlayer | | Perpendicular magnetic recording medium Coercivity Hc | |
|---|---|---|---|---|
| | Material | Optimum film thickness (nm) | (Oe) | (×10$^5$ A/m) |
| Example 1 | Co26Cr2W | 0.7 | 6984 | 5.56 |
| Example 2 | Co38Cr2W | 0.7 | 6817 | 5.42 |
| Example 3 | Co42Cr2W | 0.6 | 6827 | 5.43 |
| Comparative Example 1 | — | — | 5798 | 4.61 |

Example 4

Except for the facts that the film thickness of the second underlayer 50 was fixed at 0.5 nm and that formation of the second underlayer 50 was performed in a mixture of Ar and O$_2$ gases, the same procedure as in Example 1 was used to fabricate the perpendicular magnetic recording medium. At this time the O$_2$ concentration was varied in the range 0.5 to 3%. The second underlayer 50 of this example included a CoCrW alloy and oxides of Co, Cr and/or W.

Figure 3:
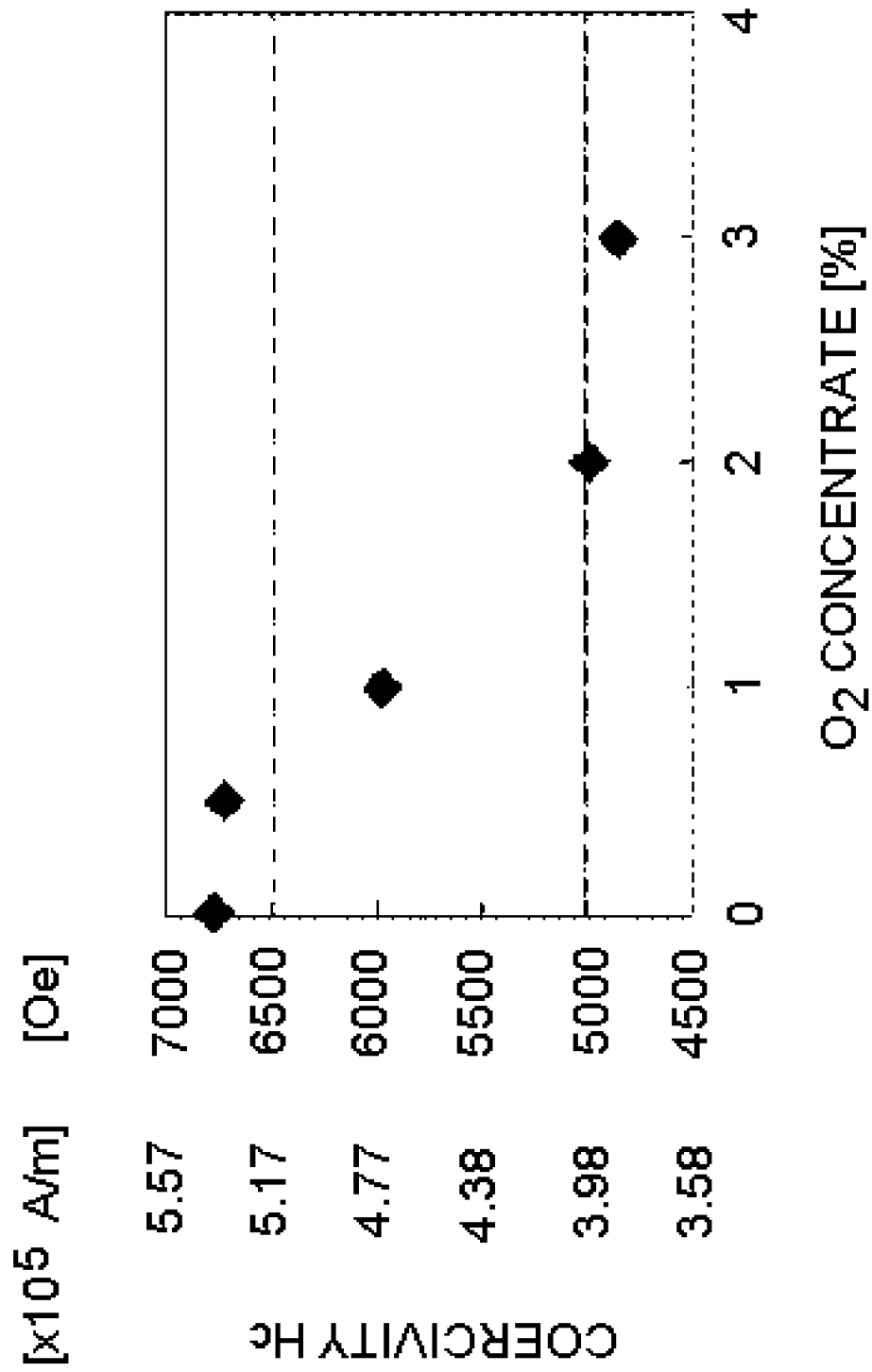
FIG. 3 is a graph showing the relation between oxygen concentration when forming the second underlayer and coercivity in Example 4.

FIG. 3 shows the relation between the O$_2$ concentration during formation of the second underlayer 50 and the coercivity Hc of the obtained perpendicular magnetic recording medium (including the result for Example 1 (O$_2$ concentration=0%)). As is seen from FIG. 3, with rising O$_2$ concentration during formation of the second underlayer 50, the coercivity Hc declines monotonically. This result suggests that in the second underlayer 50, a composition which includes an oxide (for example, a granular structure in which grain boundaries are oxides) is inappropriate.

What is claimed is:

1. A perpendicular magnetic recording medium, comprising:
   a nonmagnetic base;
   a first underlayer that is disposed over the nonmagnetic base;
   an intermediate layer that is disposed over the first underlayer, the intermediate layer being either a single layer of Ru or a Ru-based alloy, or a stacked structure of a nonmagnetic alloy film including Co and Cr and a film of Ru or a Ru-based alloy;
   a second underlayer on the intermediate layer, the second intermediate layer including Co in a range from 30 at % to 75 at %, Cr in a range from 20 at % to 60 at %, and W in a range from 0.1 at % to 10 at %, the second underlayer having a thickness in a range from 0.5 nm to 1.0 nm; and
   a magnetic recording layer on the second underlayer,
   wherein the second underlayer is substantially free of oxides.

2. The perpendicular magnetic recording medium according to claim 1, wherein the intermediate layer has a thickness in a range from 0.1 nm to 30 nm.

3. The perpendicular magnetic recording medium according to claim 2, wherein said magnetic recording layer is formed of material having a granular structure in which magnetic crystal particles are dispersed in a matrix of a nonmagnetic oxide or a nonmagnetic nitride.

4. The perpendicular magnetic recording medium according to claim 1, wherein said magnetic recording layer is formed of material having a granular structure in which magnetic crystal particles are dispersed in a matrix of a nonmagnetic oxide or a nonmagnetic nitride.

\* \* \* \* \*